(12) United States Patent
Woolward

(10) Patent No.: US 9,521,115 B1
(45) Date of Patent: Dec. 13, 2016

(54) SECURITY POLICY GENERATION USING CONTAINER METADATA

(71) Applicant: vArmour Networks, Inc., Mountain View, CA (US)

(72) Inventor: Marc Woolward, Santa Cruz, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 15/080,519

(22) Filed: Mar. 24, 2016

(51) Int. Cl.
  *H04L 29/06* (2006.01)
(52) U.S. Cl.
  CPC ........... *H04L 63/0263* (2013.01); *H04L 63/20* (2013.01)
(58) Field of Classification Search
  CPC ............................. H04L 63/0263; H04L 63/20
  See application file for complete search history.

(56) References Cited

U.S. PATENT DOCUMENTS

| | | | |
|---|---|---|---|
| 6,253,321 | B1 | 6/2001 | Nikander et al. |
| 6,578,076 | B1 | 6/2003 | Putzolu |
| 6,765,864 | B1 | 7/2004 | Natarajan et al. |
| 6,970,459 | B1 | 11/2005 | Meier |
| 7,058,712 | B1 | 6/2006 | Vasko et al. |
| 7,062,566 | B2 | 6/2006 | Amara et al. |
| 7,397,794 | B1 | 7/2008 | Lacroute et al. |
| 7,519,062 | B1 | 4/2009 | Kloth et al. |
| 7,742,414 | B1 | 6/2010 | Iannaccone et al. |
| 7,774,837 | B2 | 8/2010 | McAlister |
| 7,849,495 | B1 | 12/2010 | Huang et al. |
| 7,900,240 | B2 | 3/2011 | Terzis et al. |
| 7,904,454 | B2 | 3/2011 | Raab |
| 8,051,460 | B2 | 11/2011 | Lum et al. |
| 8,259,571 | B1 | 9/2012 | Raphel et al. |
| 8,296,459 | B1 | 10/2012 | Brandwine et al. |
| 8,307,422 | B2 | 11/2012 | Varadhan et al. |
| 8,321,862 | B2 | 11/2012 | Swamy et al. |
| 8,353,021 | B1 | 1/2013 | Satish et al. |
| 8,369,333 | B2 | 2/2013 | Hao et al. |
| 8,396,986 | B2 | 3/2013 | Kanada et al. |
| 8,490,153 | B2 | 7/2013 | Bassett et al. |

(Continued)

FOREIGN PATENT DOCUMENTS

WO     WO02098100     12/2002

OTHER PUBLICATIONS

International Search Report mailed May 3, 2016 in Patent Cooperation Treaty Application No. PCT/US2016/024116 filed Mar. 24, 2016.

(Continued)

*Primary Examiner* — Darren B Schwartz
(74) *Attorney, Agent, or Firm* — Carr & Ferrell LLP

(57) ABSTRACT

Methods, systems, and media for producing a firewall rule set are provided herein. Exemplary methods may include: receiving metadata about a deployed container from a container orchestration layer; determining an application or service associated with the container from the received metadata; retrieving at least one model using the determined application or service, the at least one model identifying expected network communications behavior of the container; and generating a high-level declarative security policy associated with the container using the at least one model, the high-level declarative security policy indicating at least an application or service with which the container can communicate.

17 Claims, 7 Drawing Sheets

(56) References Cited

U.S. PATENT DOCUMENTS

| | | | |
|---|---|---|---|
| 8,494,000 B1 | 7/2013 | Nadkarni et al. | |
| 8,565,118 B2 | 10/2013 | Shukla et al. | |
| 8,612,744 B2 | 12/2013 | Shieh | |
| 8,726,343 B1 | 5/2014 | Borzycki et al. | |
| 8,798,055 B1 | 8/2014 | An | |
| 8,813,236 B1 | 8/2014 | Saha et al. | |
| 8,935,457 B2 | 1/2015 | Feng et al. | |
| 8,990,371 B2 | 3/2015 | Kalyanaraman et al. | |
| 9,191,327 B2 | 11/2015 | Shieh | |
| 9,258,275 B2 | 2/2016 | Sun et al. | |
| 9,294,302 B2 | 3/2016 | Sun et al. | |
| 9,294,442 B1 | 3/2016 | Lian et al. | |
| 9,380,027 B1 | 6/2016 | Lian et al. | |
| 2002/0031103 A1 | 3/2002 | Wiedeman et al. | |
| 2003/0055950 A1 | 3/2003 | Cranor et al. | |
| 2003/0177389 A1 | 9/2003 | Albert et al. | |
| 2004/0062204 A1 | 4/2004 | Bearden et al. | |
| 2004/0095897 A1 | 5/2004 | Vafaei | |
| 2005/0021943 A1 | 1/2005 | Ikudome et al. | |
| 2005/0033989 A1 | 2/2005 | Poletto et al. | |
| 2005/0190758 A1 | 9/2005 | Gai et al. | |
| 2005/0201343 A1 | 9/2005 | Sivalingham et al. | |
| 2006/0050696 A1 | 3/2006 | Shah et al. | |
| 2007/0019621 A1 | 1/2007 | Perry et al. | |
| 2007/0022090 A1 | 1/2007 | Graham | |
| 2007/0064617 A1 | 3/2007 | Reves | |
| 2007/0079308 A1 | 4/2007 | Chiaramonte et al. | |
| 2007/0192863 A1 | 8/2007 | Kapoor et al. | |
| 2007/0239987 A1* | 10/2007 | Hoole | H04L 63/102 713/169 |
| 2007/0271612 A1 | 11/2007 | Fang et al. | |
| 2007/0277222 A1 | 11/2007 | Pouliot | |
| 2008/0083011 A1 | 4/2008 | McAlister et al. | |
| 2008/0155239 A1 | 6/2008 | Chowdhury et al. | |
| 2008/0239961 A1 | 10/2008 | Hilerio et al. | |
| 2008/0301770 A1 | 12/2008 | Kinder | |
| 2008/0307110 A1 | 12/2008 | Wainner et al. | |
| 2009/0165078 A1* | 6/2009 | Samudrala | G06F 21/604 726/1 |
| 2009/0190585 A1 | 7/2009 | Allen et al. | |
| 2009/0249470 A1* | 10/2009 | Litvin | H04L 63/0263 726/13 |
| 2009/0268667 A1 | 10/2009 | Gandham et al. | |
| 2009/0328187 A1 | 12/2009 | Meisel | |
| 2010/0043068 A1 | 2/2010 | Varadhan et al. | |
| 2010/0095367 A1 | 4/2010 | Narayanaswamy | |
| 2010/0192225 A1 | 7/2010 | Ma et al. | |
| 2010/0199349 A1 | 8/2010 | Ellis | |
| 2010/0228962 A1 | 9/2010 | Simon et al. | |
| 2010/0235880 A1 | 9/2010 | Chen et al. | |
| 2010/0274970 A1 | 10/2010 | Treuhaft et al. | |
| 2010/0281539 A1 | 11/2010 | Burns et al. | |
| 2010/0333165 A1 | 12/2010 | Basak et al. | |
| 2011/0003580 A1 | 1/2011 | Belrose et al. | |
| 2011/0069710 A1 | 3/2011 | Naven et al. | |
| 2011/0072486 A1* | 3/2011 | Hadar | G06F 21/6218 726/1 |
| 2011/0113472 A1 | 5/2011 | Fung et al. | |
| 2011/0138384 A1 | 6/2011 | Bozek et al. | |
| 2011/0138441 A1* | 6/2011 | Neystadt | G06F 9/5077 726/1 |
| 2011/0184993 A1* | 7/2011 | Chawla | G06F 9/45533 707/802 |
| 2011/0225624 A1 | 9/2011 | Sawhney et al. | |
| 2011/0249679 A1 | 10/2011 | Lin et al. | |
| 2011/0263238 A1 | 10/2011 | Riley et al. | |
| 2012/0017258 A1 | 1/2012 | Suzuki | |
| 2012/0113989 A1 | 5/2012 | Akiyoshi | |
| 2012/0131685 A1 | 5/2012 | Broch et al. | |
| 2012/0185913 A1 | 7/2012 | Martinez et al. | |
| 2012/0207174 A1 | 8/2012 | Shieh | |
| 2012/0216273 A1 | 8/2012 | Rolette et al. | |
| 2012/0311144 A1 | 12/2012 | Akelbein et al. | |
| 2012/0311575 A1 | 12/2012 | Song | |
| 2013/0019277 A1* | 1/2013 | Chang | H04L 63/0218 726/1 |
| 2013/0081142 A1 | 3/2013 | McDougal et al. | |
| 2013/0086399 A1 | 4/2013 | Tychon et al. | |
| 2013/0097692 A1 | 4/2013 | Cooper et al. | |
| 2013/0151680 A1* | 6/2013 | Salinas | G06F 17/30557 709/223 |
| 2013/0166490 A1 | 6/2013 | Elkins et al. | |
| 2013/0166720 A1 | 6/2013 | Takashima et al. | |
| 2013/0219384 A1 | 8/2013 | Srinivasan et al. | |
| 2013/0223226 A1 | 8/2013 | Narayanan et al. | |
| 2013/0250956 A1 | 9/2013 | Sun et al. | |
| 2013/0275592 A1 | 10/2013 | Xu et al. | |
| 2013/0276092 A1 | 10/2013 | Sun et al. | |
| 2013/0291088 A1 | 10/2013 | Shieh et al. | |
| 2013/0298184 A1* | 11/2013 | Ermagan | G06F 21/54 726/1 |
| 2013/0318617 A1 | 11/2013 | Chaturvedi et al. | |
| 2014/0007181 A1* | 1/2014 | Sarin | G06F 21/50 726/1 |
| 2014/0022894 A1 | 1/2014 | Oikawa et al. | |
| 2014/0137240 A1 | 5/2014 | Smith et al. | |
| 2014/0157352 A1 | 6/2014 | Paek et al. | |
| 2014/0282518 A1* | 9/2014 | Banerjee | G06F 9/45533 718/1 |
| 2015/0124606 A1 | 5/2015 | Alvarez et al. | |
| 2015/0163088 A1* | 6/2015 | Anschutz | G06F 21/57 709/224 |
| 2015/0249676 A1 | 9/2015 | Koyanagi et al. | |
| 2015/0269383 A1* | 9/2015 | Lang | G06F 21/57 726/1 |
| 2016/0028851 A1 | 1/2016 | Shieh | |
| 2016/0191545 A1 | 6/2016 | Nanda et al. | |

OTHER PUBLICATIONS

International Search Report mailed May 3, 2016 in Patent Cooperation Treaty Application No. PCT/US2016/024300 filed Mar. 25, 2016.

International Search Report mailed May 3, 2016 in Patent Cooperation Treaty Application No. PCT/US2016/024053 filed Mar. 24, 2016.

International Search Report mailed May 6, 2016 in Patent Cooperation Treaty Application No. PCT/US2016/019643 filed Feb. 25, 2016.

Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection.

Specification, U.S. Appl. No. 14/673,640, filed Mar. 30, 2015.

Specification, U.S. Appl. No. 14/677,827, filed Apr. 2, 2015.

Specification, U.S. Appl. No. 14/657,282, filed Mar. 13, 2015.

Specification, U.S. Appl. No. 14/657,210, filed Mar. 13, 2015.

International Search Report mailed Jun. 20, 2016 in Patent Cooperation Treaty Application No. PCT/US2016/024310 filed Mar. 25, 2016, pp. 1-9.

Non-Final Office Action in U.S. Appl. No. 15/151,303, mailed Jul. 6, 2016, pp. 1-17.

Final Office Action in U.S. Appl. No. 14/877,836, mailed Jul. 7, 2016, pp. 1-15.

Non-Final Office Action in U.S. Appl. No. 15/090,523, mailed Jul. 25, 2016, pp. 1-22.

Non-Final Office Action in U.S. Appl. No. 14/657,210, mailed Aug. 2, 2016, pp. 1-25.

\* cited by examiner

```
400A kubectl get services
NAME            LABELS                                          SELECTOR    IP                PORT
kubernetes-ro   component=apiserver,provider=kubernetes         <none>      10.254.47.161     80
kubernetes      component=apiserver,provider=kubernetes         <none>      10.254.153.242    443

(and at an image level)
desiredState:
  replicas: 1
  replicaSelector:
    selectorname: "webserver"
  podTemplate:
    desiredState:
      manifest:
        version: "v1beta1"
        id: "webserver-controller"
        containers:
          - name: "apache-frontend"
            image: "webwithdb"
            ports:
              - containerPort: 80
                hostPort: 80
```

FIG. 4A

| Service Type | Protocols/Common Ports | Target (allowed communication partners) | Direction | Application Payload / Message Semantics |
|---|---|---|---|---|
| Web Server (IIS, Apache) | HTTP/80 | User Devices | Incoming | HTTP |
| | SMB (tcp/445), NFS (tcp/2049) | File Servers | Outbound | SMB, NFS |
| | Common secure mgmt applications | Infrastructure Mgmt devices | Incoming | Ssh, ICMP |
| File Server (HFS) | HTTP/80 | application servers | incoming | http1.1 and above, SMB, NFS |
| | Common secure mgmt applications | Infrastructure Mgmt devices | Incoming | Ssh, ICMP |
| Postgress SQL server | tcp/5432 | application servers | incoming | postgress SQL |
| | tcp/5432 | postgres SQL servers | incoming / outbound | postgres SQL replication |
| | Common secure mgmt applications | Infrastructure Mgmt devices | Incoming | Ssh, ICMP |
| | iscsi tcp/860 | iSCSI target | Outgoing | iscsi |
| iSCSI Server (Openfiler) | iscsi/860 | postgres SQL servers | Incoming | iscsi |
| | Common secure mgmt applications | Infrastructure Mgmt devices | Incoming | Ssh, ICMP |
| RabbitMQ | amqp tcp/5672 | application servers | incoming | amqp 0.9.1 or above |
| | Common secure mgmt applications | Infrastructure Mgmt devices | Incoming | Ssh, ICMP |
| | dns tcp, udp/53 | DNS servers | Outbound | DNS name resolution |
| OpenDNS | dns tcp,udp/53 | Any | Inbound/outbound | DNS name resolution |
| | Common secure mgmt applications | Infrastructure Mgmt devices | Incoming | Ssh, ICMP |
| | dhcp udp/67-68 | Any | Incoming / Outbound | DHCP |

SECURITY POLICY GENERATION USING CONTAINER METADATA

FIELD OF THE INVENTION

The present technology pertains to computer security, and more specifically to computer network security.

BACKGROUND ART

A hardware firewall is a network security system that controls incoming and outgoing network traffic. A hardware firewall generally creates a barrier between an internal network (assumed to be trusted and secure) and another network (e.g., the Internet) that is assumed not to be trusted and secure.

Attackers breach internal networks to steal critical data. For example, attackers target low-profile assets to enter the internal network. Inside the internal network and behind the hardware firewall, attackers move laterally across the internal network, exploiting East-West traffic flows, to critical enterprise assets. Once there, attackers siphon off valuable company and customer data.

SUMMARY OF THE INVENTION

Some embodiments of the present technology include computer-implemented methods for security in a container-based virtualization environment which may include: receiving metadata about a deployed container from a container orchestration layer; determining an application or service associated with the container from the received metadata; retrieving at least one model using the determined application or service, the at least one model identifying expected network communications behavior of the container; and generating a high-level declarative security policy associated with the container using the at least one model, the high-level declarative security policy indicating at least an application or service with which the container can communicate.

Various embodiments of the present technology include systems for producing a firewall rule set comprising: a processor; and a memory communicatively coupled to the processor, the memory storing instructions executable by the processor to perform a method comprising: receiving metadata about a deployed container from a container orchestration layer; determining an application or service associated with the container from the received metadata; retrieving at least one model using the determined application or service, the at least one model identifying expected network communications behavior of the container; and generating a high-level declarative security policy associated with the container using the at least one model, the high-level declarative security policy indicating at least an application or service with which the container can communicate In some embodiments, the present technology includes non-transitory computer-readable storage media having embodied thereon a program, the program being executable by a processor to perform a method for producing a firewall rule set, the method comprising: receiving metadata about a deployed container from a container orchestration layer; determining an application or service associated with the container from the received metadata; retrieving at least one model using the determined application or service, the at least one model identifying expected network communications behavior of the container; and generating a high-level declarative security policy associated with the container using the at least one model, the high-level declarative security policy indicating at least an application or service with which the container can communicate.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 4A illustrates example metadata, in accordance with various embodiments.

FIG. 4B is a table of example expected behaviors, according to some embodiments.

DETAILED DESCRIPTION

Figure 1:
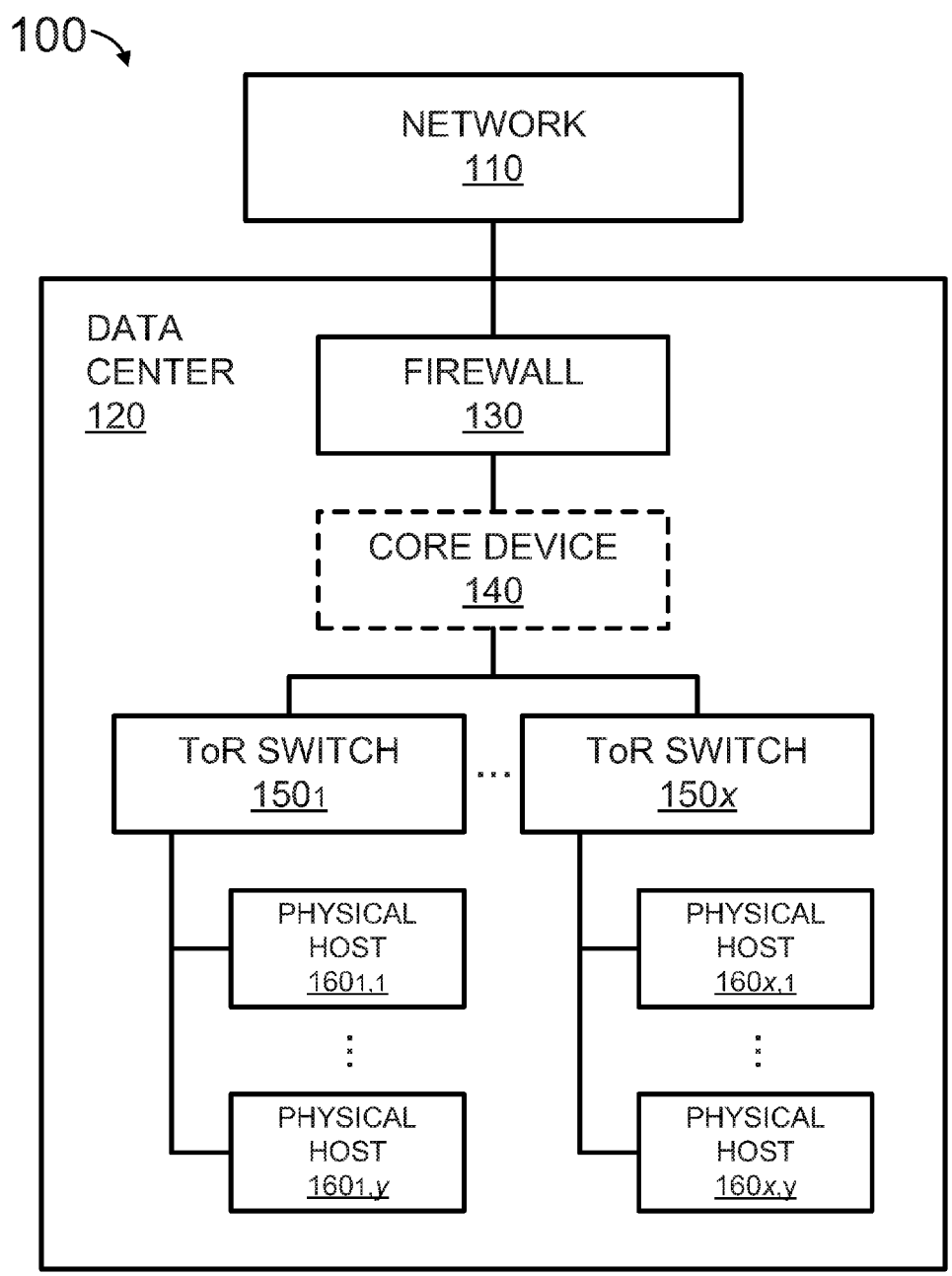
FIG. 1 is a simplified block diagram of a (physical) environment, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Information technology (IT) organizations face cyber threats and advanced attacks. Firewalls are an important part of network security. Firewalls control incoming and outgoing network traffic using a rule set. A rule, for example, allows a connection to a specific (Internet Protocol (IP))

address, allows a connection to a specific (IP) address if the connection is secured (e.g., using Internet Protocol security (IPsec)), blocks a connection to a specific (IP) address, redirects a connection from one IP address to another IP address, logs communications to and/or from a specific IP address, and the like. A firewall rule at a low level of abstraction may indicate a specific (IP) address and protocol to which connections are allowed and/or not allowed.

Managing a set of firewall rules is a difficult challenge. Some IT security organizations have a large staff (e.g., dozens of staff members) dedicated to maintaining firewall policy (e.g., a firewall rule set). A firewall rule set can have tens of thousands or even hundreds of thousands of rules. Some embodiments of the present technology may autonomically generate a reliable declarative security policy at a high level of abstraction. Abstraction is a technique for managing complexity by establishing a level of complexity which suppresses the more complex details below the current level. The high-level declarative policy may be compiled to produce a firewall rule set at a low level of abstraction.

FIG. 1 illustrates a system 100 according to some embodiments. System 100 includes network 110 and data center 120. Data center 120 includes firewall 130, optional core switch/router (also referred to as a core device) 140, Top of Rack (ToR) switches $150_1$-$150_x$, and physical hosts $160_{1,1}$-$160_{x,y}$.

Network 110 (also referred to as a computer network or data network) is a telecommunications network that allows computers to exchange data. For example, in network 110, networked computing devices pass data to each other along data connections (e.g., network links). Data is transferred in the form of packets. The connections between nodes are established using either cable media or wireless media. For example, network 110 includes at least one of a local area network (LAN), wireless local area network (WLAN), wide area network (WAN), metropolitan area network (MAN), and the like. In some embodiments, network 110 includes the Internet.

Data center 120 is a facility used to house computer systems and associated components. Data center 120, for example, comprises computing resources for cloud computing services or operated for the benefit of a particular organization. Data center equipment, for example, is generally mounted in rack cabinets, which are usually placed in single rows forming corridors (e.g., aisles) between them. Firewall 130 creates a barrier between data center 120 and network 110 by controlling incoming and outgoing network traffic based on a rule set.

Optional core switch/router 140 is a high-capacity switch/router that serves as a gateway to network 110 and provides communications between ToR switches $150_1$ and $150_x$, and between ToR switches $150_1$ and $150_x$ and network 110. ToR switches $150_1$ and $150_x$ connect physical hosts $160_{1,1}$-$160_{1,y}$ and $160_{x,1}$-$160_{x,y}$ (respectively) together and to network 110 (optionally through core switch/router 140). For example, ToR switches $150_1$-$150_x$ use a form of packet switching to forward data to a destination physical host (of physical hosts $160_{1,1}$-$160_{1,y}$) and (only) transmit a received message to the physical host for which the message was intended.

Physical hosts $160_{1,1}$-$160_{x,y}$ are computing devices that act as computing servers such as blade servers. Computing devices are described further in relation to FIG. 5.

Figure 2:
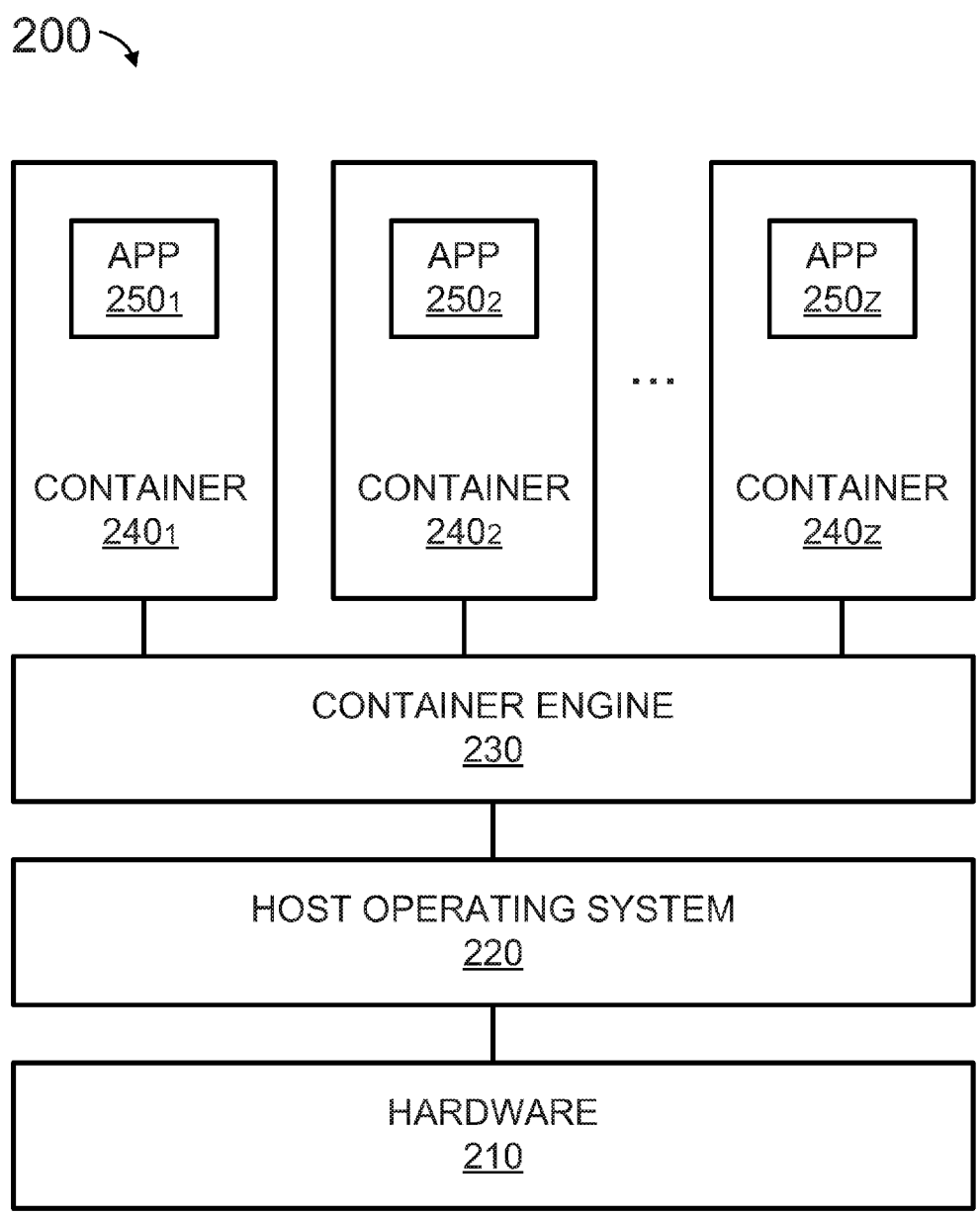
FIG. 2 is simplified block diagram of an environment, in accordance with various embodiments.

FIG. 2 depicts environment 200 according to various embodiments.

Environment 200 includes hardware 210, host operating system 220, container engine 230, and containers $240_1$-$240_z$.

In some embodiments, hardware 210 is implemented in at least one of physical hosts $160_{1,1}$-$160_{x,y}$ (FIG. 1). Host operating system 220 runs on hardware 210 and can also be referred to as the host kernel. By way of non-limiting example, host operating system 220 can be at least one of: Linux, Red Hat Atomic Host, CoreOS, Ubuntu Snappy, Pivotal Cloud Foundry, Oracle Solaris, and the like. Host operating system 220 allows for multiple (instead of just one) isolated user-space instances (e.g., containers $240_1$-$240_z$) to run in host operating system 220 (e.g., a single operating system instance).

Host operating system 220 can include a container engine 230. Container engine 230 can create and manage containers $240_1$-$240_z$, for example, using an (high-level) application programming interface (API). By way of non-limiting example, container engine 230 is at least one of Docker, Rocket (rkt), Solaris Containers, and the like. For example, container engine 230 may create a container (e.g., one of containers $240_1$-$240_z$) using an image. An image can be a (read-only) template comprising multiple layers and can be built from a base image (e.g., for host operating system 220) using instructions (e.g., run a command, add a file or directory, create an environment variable, indicate what process (e.g., application or service) to run, etc.). Each image may be identified or referred to by an image type. In some embodiments, images (e.g., different image types) are stored and delivered by a system (e.g., server side application) referred to as a registry or hub (not shown in FIG. 2).

Container engine 230 can allocate a filesystem of host operating system 220 to the container and add a read-write layer to the image. Container engine 230 can create a network interface that allows the container to communicate with hardware 210 (e.g., talk to a local host). Container engine 230 can set up an Internet Protocol (IP) address for the container (e.g., find and attach an available IP address from a pool). Container engine 230 can launch a process (e.g., application or service) specified by the image (e.g., run an application, such as one of APP $250_1$-$250_z$, described further below). Container engine 230 can capture and provide application output for the container (e.g., connect and log standard input, outputs and errors). The above examples are only for illustrative purposes and are not intended to be limiting.

Containers $240_1$-$240_z$ can be created by container engine 230. In some embodiments, containers $240_1$-$240_z$, are each an environment as close as possible to an installation of host operating system 220, but without the need for a separate kernel. For example, containers $240_1$-$240_z$ share the same operating system kernel with each other and with host operating system 220. Each container of containers $240_1$-$240_z$ can run as an isolated process in user space on host operating system 220. Shared parts of host operating system 220 can be read only, while each container of containers $240_1$-$240_z$ can have its own mount for writing.

Containers $240_1$-$240_z$ can include one or more applications (APP) $250_1$-$250_z$ (and all of their respective dependencies). APP $250_1$-$250_z$ can be any application or service. By way of non-limiting example, APP $250_1$-$250_z$ can be a database (e.g., Microsoft® SQL Server®, MongoDB, HTFS, etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, etc.), service-oriented architecture (SOA) and/or microservices process, object-based storage (e.g., Lustre®, EMC® Centera, Scality® RING®, etc.), directory service (e.g., Microsoft® Active Directory®, Domain Name System (DNS) hosting service, etc.), and the like.

In contrast to hypervisor-based virtualization using conventional virtual machines (VMs; not depicted in FIG. 2), containers $240_1$-$240_z$ may be an abstraction performed at the operating system (OS) level, whereas VMs are an abstraction of physical hardware. Since VMs virtualize hardware, each VM instantiation has a full server hardware stack from virtualized Basic Input/Output System (BIOS) to virtualized network adapters, storage, and central processing unit (CPU). The entire hardware stack means that each VM needs its own complete OS instantiation and each VM must boot the full OS. Accordingly, VMs are generally slower and consume more system resources (e.g., memory and processor resources), than containers $240_1$-$240_z$. Each of VMs and containers $240_1$-$240_z$ can be referred to as workloads.

Figure 3:
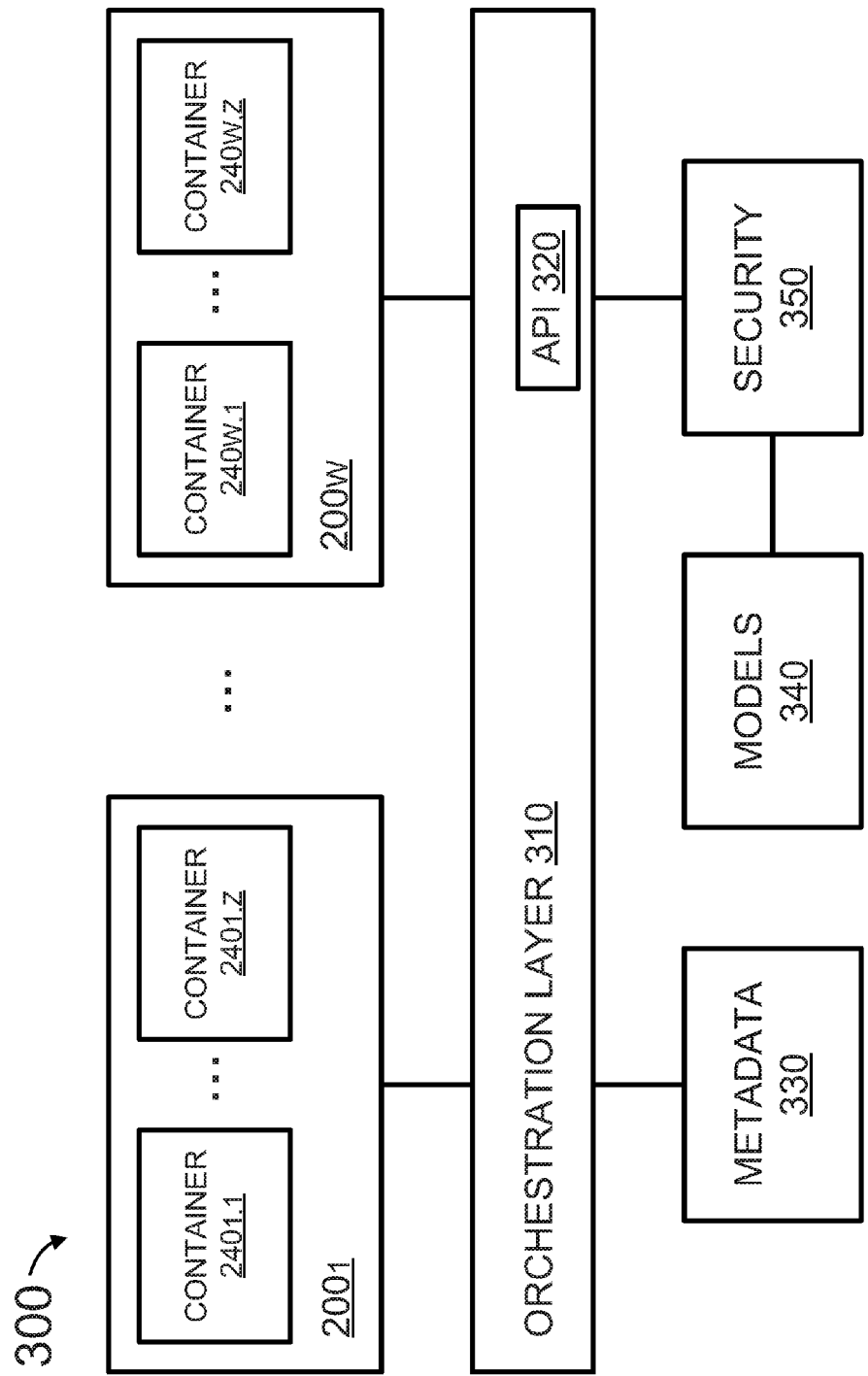
FIG. 3 is a simplified block diagram of an environment, according to some embodiments.

FIG. 3 illustrates environment 300, according to some embodiments. Environment 300 can include one or more environments $200_1$-$200_w$, orchestration layer 310, metadata 330, models 340, and security 350. Environments $200_1$-$200_w$ can be instances of environment 200 (FIG. 2) and be in at least one of data center 120 (FIG. 1). Containers $240_{1,1}$-$240_{w,z}$ (e.g., in a respective environment of environments $200_1$-$200_w$) can be a container as described in relation to containers $240_1$-$240_z$ (FIG. 2).

Orchestration layer 310 can manage and deploy containers across one or more environments $200_1$-$200_w$ in one or more data centers of data center 120 (FIG. 1). In some embodiments, to manage and deploy containers, orchestration layer 310 receives one or more image types (e.g., named images) from a data storage and content delivery system referred to as a registry (not shown in FIG. 3). By way of non-limiting example, the registry can be the Google Container Registry. In various embodiments, orchestration layer 310 determines which environment of environments $200_1$-$200_w$ should receive each container of containers $240_1$-$240_z$ (e.g., based on the environments' $200_1$-$200_w$ current workload and a given redundancy target). Orchestration layer 310 can provide means of discovery and communication between containers $240_1$-$240_z$. According to some embodiments, orchestration layer 310 runs virtually (e.g., in one or more containers orchestrated by a different one of orchestration layer 310) and/or physically (e.g., in one or more physical hosts of physical hosts $160_{1,1}$-$160_{x,y}$ (FIG. 1)) in one or more of data center 120. By way of non-limiting example, orchestration layer 310 is at least one of Docker Swarm®, Kubernetes®, Cloud Foundry® Diego, Apache® Mesos™, and the like.

Orchestration layer 310 can maintain (e.g., create and update) metadata 330. Metadata 330 can include reliable and authoritative metadata concerning containers (e.g., containers $240_1$-$240_z$). FIG. 4A illustrates metadata example 400A, a non-limiting example of metadata 330. By way of illustration, metadata example 400A indicates for a container at least one of: an image name (e.g., file name including at least one of a network device (such as a host, node, or server) that contains the file, hardware device or drive, directory tree (such as a directory or path), base name of the file, type (such as format or extension) indicating the content type of the file, and version (such as revision or generation number of the file)), an image type (e.g., including name of an application or service running), the machine with which the container is communicating (e.g., IP address, host name, etc.), a respective port through which the container is communicating, and other tag and/or label (e.g., a (user-configurable) tag or label such as a Kubernetes® tag, Docker® label, etc.), and the like. In various embodiments, metadata 330 is generated by orchestration layer 310—which manages and deploys containers—and can be very timely (e.g., metadata is available soon after an associated container is created) and highly reliable (e.g., accurate). In addition or alternative to metadata example 400A, other metadata may comprise metadata 330 (FIG. 3). For example, other elements (e.g., service name, (user-configurable) tag and/or label, and the like) associated with models 340 are used. By way of further non-limiting example, metadata 430 includes an application determination using application identification (AppID). AppID can process data packets at a byte level and can employ signature analysis, protocol analysis, heuristics, and/or behavioral analysis to identify an application and/or service. In some embodiments, AppID selectively inspects only a part of a data payload (e.g., only parts of some of the data packets). By way of non-limiting example, AppID is at least one of Cisco Systems® OpenAppID, Qosmos ixEngine®, Palo Alto Networks® APP-ID™, and the like.

Referring back to FIG. 3, security 350 can receive metadata 330, for example, through application programming interface (API) 320. Other interfaces can be used to receive metadata 330. In some embodiments, security 350 can include models 340. Models 340 can include a model of expected (network communications) behavior for an image type. For example, expected (network communications) behaviors can include at least one of: protocols and/or ports that should be used by a container and who the container should talk to (e.g., relationships between containers, such as other applications and/or services the container should talk to), and the like. In various embodiments, models 440 are modifiable by an operator, such that security policy is adapted to the evolving security challenges confronting the IT organization.

FIG. 4B shows table 400B including non-limiting examples of expected behaviors. For example, database server 410B can be expected to communicate using transmission control protocol (TCP), common secure management applications, and Internet Small Computer System (iSCSI) TCP. By way of further non-limiting example, database server 410B can be expected to communicate with application servers, other database servers, infrastructure management devices, and iSCSI target. In some embodiments, if database server 410B were to communicate with a user device using Hypertext Transfer Protocol (HTTP), then such a deviation from expected behavior could be used at least in part to detect a security breach.

By way of additional non-limiting example, file server 420B (e.g., HTTP File Server or HFS) can be expected to communicate using HTTP and common secure management applications. For example, file server 420B can be expected to communicate with application servers and infrastructure management devices. In various embodiments, if file server 420B were to communicate with a user device using Hypertext Transfer Protocol (HTTP), then such a deviation from expected behavior could be used at least in part to detect a security breach.

Many other deviations from expected behavior are possible. Additionally, other different combinations and/or permutations of services, protocols (e.g., Advanced Message Queuing Protocol (AMQP), DNS, Dynamic Host Configuration Protocol (DHCP), Network File System (NFS), Server Message Block (SMB), User Datagram Protocol (UDP), and the like) and common ports, communication partners, direction, and application payload and/or message semantics (e.g., Secure Shell (SSH), Internet Control Message Protocol (ICMP), Structured Query Language (SQL), and the like), including ones not depicted in FIG. 4B may be used.

In some embodiments, using metadata 330 and models 340, security 350 applies heuristics to generate a high-level declarative security policy associated with a container (e.g., of containers $240_{1,1}$-$240_{w,z}$). A high-level security policy can comprise one or more high-level security statements, where there is one high-level security statement per allowed protocol, port, and/or relationship combination. In some embodiments, security 350 determines an image type using metadata 330 and matches the image type with one or more models 340 associated with the image type. For example, if/when the image type corresponds to a certain database application, then one or more models associated with that database are determined. A list of at least one of: allowed protocols, ports, and relationships for the database may be determined using the matched model(s).

In various embodiments, security 350 produces a high-level declarative security policy for the container using the list of at least one of: allowed protocols, ports, and relationships. The high-level declarative security policy can be at least one of: a statement of protocols and/or ports the container is allowed to use, indicate applications/services that the container is allowed to communicate with, and indicate a direction (e.g., incoming and/or outgoing) of permitted communications. According to some embodiments, single application/service is subsequently used to identify several different machines associated with the single application/service. The high-level declarative security policy is at a high level of abstraction, in contrast with low-level firewall rules, which are at a low level of abstraction and only identify specific machines by IP address and/or hostname. Accordingly, one high-level declarative security statement can be compiled to produce hundreds or more of low-level firewall rules.

The high-level security policy can be compiled by security 350 (or other machine) to produce a low-level firewall rule set. Compilation is described further in related U.S. patent application "Conditional Declarative Policies" (application Ser. No. 14/673,640) filed Mar. 30, 2015, which is hereby incorporated by reference for all purposes.

According to some embodiments, a low-level firewall rule set is used by security 350 to determine when the high-level security policy is (possibly) violated. For example, a database (e.g., in a container of containers $240_{1,1}$-$240_{w,z}$) serving web pages using the Hypertext Transfer Protocol (HTTP) and/or communicating with external networks (e.g., network 110 of FIG. 1) could violate a high-level declarative security policy for that database container. In various embodiments, security 350 is an enforcement point (e.g., in a container of containers $240_{1,1}$-$240_{w,z}$). Enforcement points are described further in related U.S. patent application "Methods and Systems for Orchestrating Physical and Virtual Switches to Enforce Security Boundaries" (application Ser. No. 14/677,827) filed Apr. 2, 2015, which is hereby incorporated by reference for all purposes. Detection of a (potential) violation of the high-level security policy and violation handling are described further in related U.S. patent application "System and Method for Threat-Driven Security Policy Controls" (application Ser. No. 14/673,679) filed Mar. 30, 2015, which is hereby incorporated by reference for all purposes. For example, when a (potential) violation of the high-level security policy is detected, security 350 (or other machine, such as an enforcement point) issues an alert and/or drops/forwards network traffic that violates the high-level declarative security policy.

Figure 5:
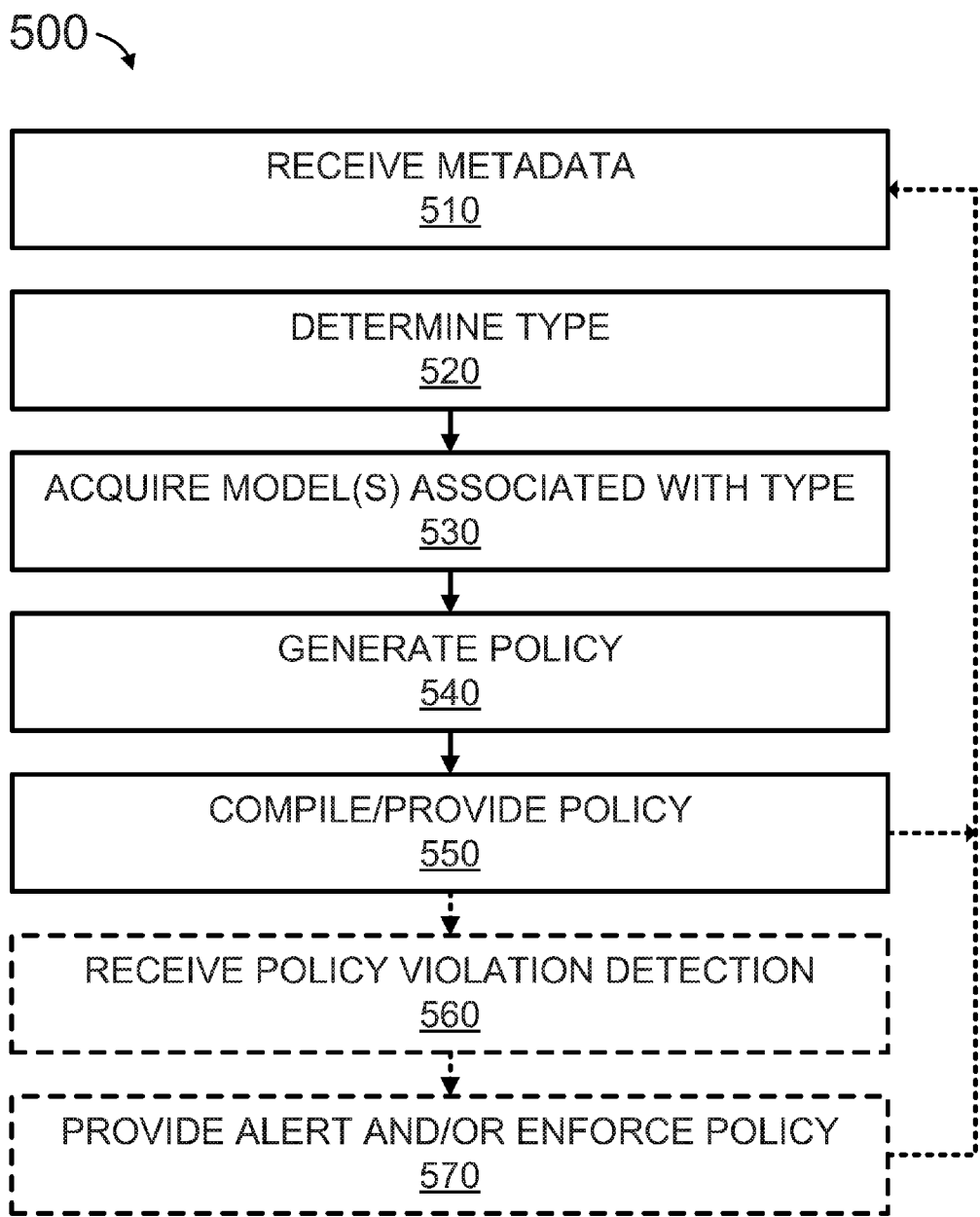
FIG. 5 is a simplified flow diagram of a method, in accordance with various embodiments.

FIG. 5 illustrates a method 500 for generating a high-level declarative security policy (or statement), according to some embodiments. In various embodiments, method 500 is performed by security 350. At step 510, metadata 330 (FIG. 3) can be received. For example, when orchestration layer 310 deploys a container (e.g., a container of containers $240_{1,1}$-$240_{w,z}$) and updates metadata 330 to reflect the newly deployed container, security 350 can receive updated metadata 330 including the newly deployed container from orchestration layer 310 using API 320. Other interfaces can be used to receive metadata 330. At step 520, a type can be determined from the received metadata. For example, an image type associated with the container in metadata 330 can be determined. By way of further non-limiting example, an application/service running in the container is determined from the image type.

In addition or alternative to image type, another tag and/or label (e.g., (user-configurable) name) can be used to indicate application grouping. For example, an operator using a tag and/or label may introduce more granularity into the service definition (e.g., differentiating between internal- and external-facing Web servers), and customize default heuristics based upon their specific application architectures. In this way, heuristics can be modifiable and extensible.

At step 530, models associated with the image type and/or the application/service running may be acquired. At step 540, a high-level declarative security policy can be generated for the container using the model. At step 550, the high-level declarative security policy can be compiled or provided to another machine for compiling. After step 550, method 500 can optionally proceed back to step 510.

Alternatively, method 500 can optionally continue at step 560, where an indication of a possible violation of the high-level declarative security policy may be received, for example in response to a determination (e.g., by security 350 or another machine, such as an enforcement point) that the compiled security policy is potentially violated. Optionally, method 500 can continue to step 570, where an alert is provided and/or violating network communications are dropped (e.g., blocked) or redirected. After step 570, method 500 can optionally proceed back to step 510.

In some embodiments, method 500 is performed autonomically without intervention by an operator. Operator intervention may not be needed, since timely and authoritative metadata 330 (FIG. 3) is accurate, reducing the likelihood an incorrect high-level descriptive security policy will be produced.

Figure 6:
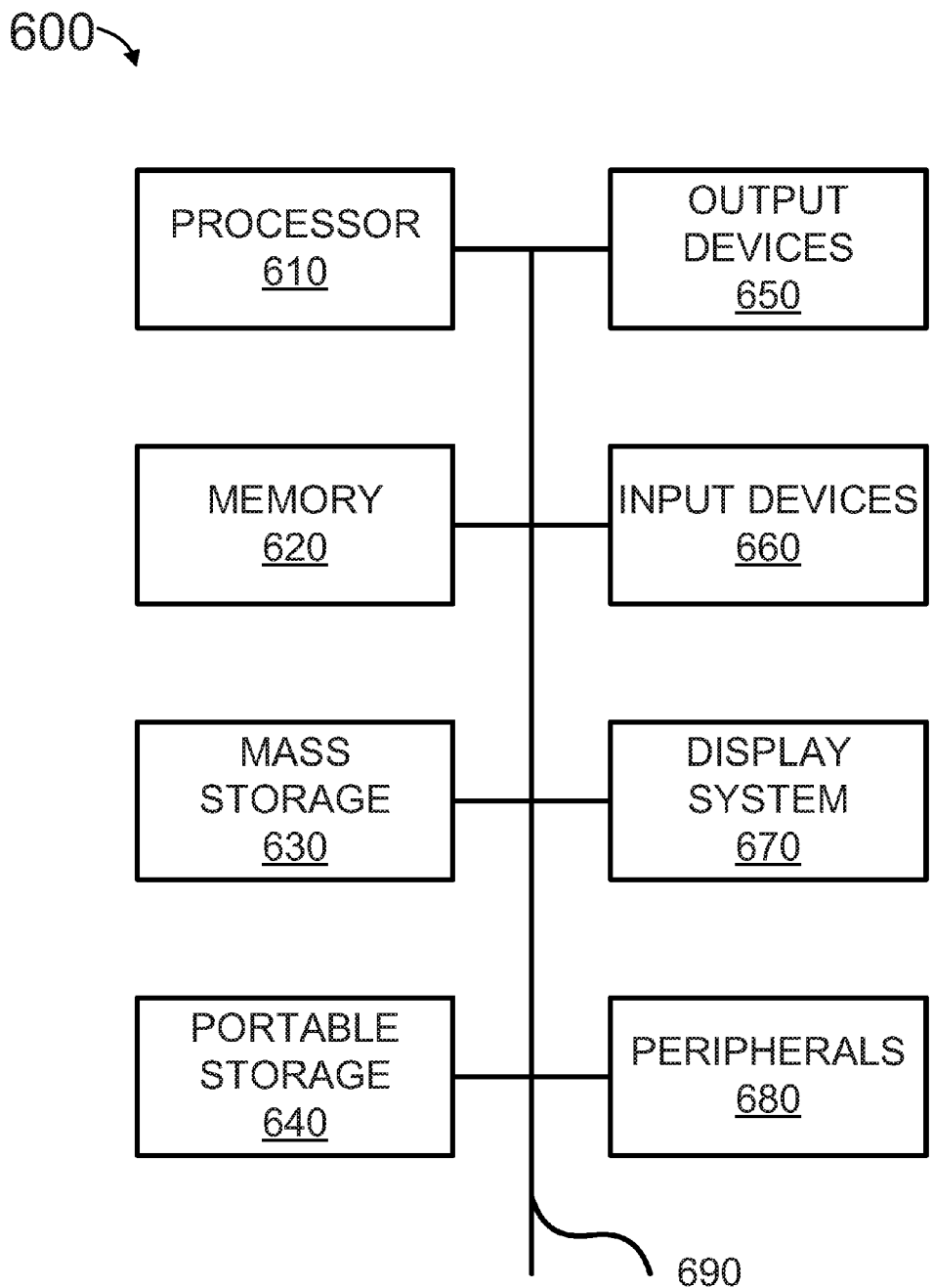
FIG. 6 is a simplified block diagram of a computing system, according to some embodiments.

FIG. 6 illustrates an exemplary computer system 600 that may be used to implement some embodiments of the present invention. The computer system 600 in FIG. 6 may be implemented in the contexts of the likes of computing systems, networks, servers, or combinations thereof. The computer system 600 in FIG. 6 includes one or more processor unit(s) 610 and main memory 620. Main memory 620 stores, in part, instructions and data for execution by processor unit(s) 610. Main memory 620 stores the executable code when in operation, in this example. The computer system 600 in FIG. 6 further includes a mass data storage 630, portable storage device 640, output devices 650, user input devices 660, a graphics display system 670, and peripheral device(s) 680.

The components shown in FIG. 6 are depicted as being connected via a single bus 690. The components may be connected through one or more data transport means. Processor unit(s) 610 and main memory 620 are connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit(s) 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 in FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device.

Peripheral device(s) 680 may include any type of computer support device to add additional functionality to the computer system.

The components provided in the computer system 600 in FIG. 6 are those typically found in computer systems that may be suitable for use with embodiments of the present disclosure and are intended to represent a broad category of such computer components that are well known in the art. Thus, the computer system 600 in FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 600 may be implemented as a cloud-based computing environment, such as a virtual machine operating within a computing cloud. In other embodiments, the computing system 600 may itself include a cloud-based computing environment, where the functionalities of the computing system 600 are executed in a distributed fashion. Thus, the computing system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A method for security in a container-based virtualization environment comprising:
    receiving metadata about a deployed container from a container orchestration layer, the metadata including an image type of the deployed container, the deployed container being deployed in a hardware server;
    determining an application or service performed by the deployed container from the received metadata;
    retrieving at least one model using the determined application or service, the at least one model identifying expected network communications behavior of the deployed container;
    generating a high-level declarative security policy associated with the deployed container using the at least one model, the high-level declarative security policy indicating at least an application or service with which the deployed container communicates; and
    launching a compiler, the compiler producing a low-level firewall rule set using the high-level declarative security policy, the low-level firewall rule set being provided to an enforcement point, the enforcement point applying the low-level firewall rule set to data network traffic.

2. The method of claim 1, in which the metadata is received from the container orchestration layer using at least an application programming interface (API).

3. The method of claim 1, in which:
    the metadata further includes at least one of an image name, service name, ports, and other tags and/or labels associated with the deployed container; and
    the at least one of the image name, service name, ports, and other tags and/or labels is associated with the determined application or service.

4. The method of claim 1, in which the determining the application or service includes:
    identifying the determined application or service using the image type.

5. The method of claim 1, in which the deployed container is at least one of: a Docker container and a Rocket (rkt) container.

6. The method of claim 5, in which the container orchestration layer is at least one of: Docker Swarm, Kubernetes, Diego, and Mesos.

7. The method of claim 1, in which the determined application or service is at least one of: a database, email server, message queue, web server, Session Initiation Protocol (SIP) server, file server, object-based storage, naming system, storage networking, and directory.

8. The method of claim 1 further comprising:
determining a potential violation of the high-level declarative security policy using the low-level firewall rule set; and
performing at least one of: sending an alert, dropping communications associated with the potential violation, and forwarding communications associated with the potential violation.

9. A system for security in a container-based virtualization environment comprising:
a hardware processor; and
a memory coupled to the hardware processor, the memory storing instructions which are executable by the hardware processor to perform a method comprising:
receiving metadata about a deployed container from a container orchestration layer, the metadata including an image type of the deployed container, the deployed container being deployed in a hardware server;
determining an application or service performed by the deployed container from the received metadata;
retrieving at least one model using the determined application or service, the at least one model identifying expected network communications behavior of the deployed container;
generating a high-level declarative security policy associated with the deployed container using the at least one model, the high-level declarative security policy indicating at least an application or service with which the deployed container communicates; and
launching a compiler, the compiler producing a low-level firewall rule set using the high-level declarative security policy, the low-level firewall rule set being provided to an enforcement point, the enforcement point applying the low-level firewall rule set to data network traffic.

10. The system of claim 9, wherein the metadata is received from the container orchestration layer using at least an application programming interface (API).

11. The system of claim 9, in which:
the metadata further includes at least one of an image name, service name, ports, and other tags and/or labels associated with the deployed container; and
the at least one of the image name, service name, ports, and other tags and/or labels is associated with the determined application or service.

12. The system of claim 9, in which the determining the application or service includes:
identifying the determined application or service using the image type.

13. The system of claim 9, in which the deployed container is at least one of: a Docker container and a Rocket (rkt) container.

14. The system of claim 13, in which the container orchestration layer is at least one of: Docker Swarm, Kubernetes, Diego, and Mesos.

15. The system of claim 9, in which the determined application or service is at least one of: a database, email server, message queue, web server, Session Initiation Protocol (SIP) server, file server, object-based storage, naming system, storage networking, and directory.

16. The system of claim 9, in which the method further comprises:
determining a potential violation of the high-level declarative security policy using the low-level firewall rule set; and
performing at least one of: sending an alert, dropping communications associated with the potential violation, and forwarding communications associated with the potential violation.

17. A non-transitory computer-readable storage medium having embodied thereon a program, the program being executable by a processor to perform a method for security in a container-based virtualization environment, the method comprising:
receiving metadata about a deployed container from a container orchestration layer, the metadata including an image type of the deployed container, the deployed container being deployed in a hardware server;
determining an application or service performed by the deployed container from the received metadata;
retrieving at least one model using the determined application or service, the at least one model identifying expected network communications behavior of the deployed container;
generating a high-level declarative security policy associated with the deployed container using the at least one model, the high-level declarative security policy indicating at least an application or service with which the deployed container communicates; and
launching a compiler, the compiler producing a low-level firewall rule set using the high-level declarative security policy, the low-level firewall rule set being provided to an enforcement point, the enforcement point applying the low-level firewall rule set to data network traffic.

* * * * *